(12) United States Patent
Hamasaki et al.

(10) Patent No.: US 12,240,212 B2
(45) Date of Patent: Mar. 4, 2025

(54) LAYERED BODY

(71) Applicant: TOYOBO CO., LTD., Osaka (JP)

(72) Inventors: Ryo Hamasaki, Shiga (JP); Junki Saito, Shiga (JP); Daiki Funaoka, Tokyo (JP)

(73) Assignee: TOYOBO MC CORPORATION, Osaka (JP)

( * ) Notice: Subject to any disclaimer, the term of this patent is extended or adjusted under 35 U.S.C. 154(b) by 435 days.

(21) Appl. No.: 17/765,250

(22) PCT Filed: Oct. 12, 2020

(86) PCT No.: PCT/JP2020/038464
§ 371 (c)(1),
(2) Date: Mar. 30, 2022

(87) PCT Pub. No.: WO2021/085099
PCT Pub. Date: May 6, 2021

(65) Prior Publication Data
US 2022/0347991 A1 Nov. 3, 2022

(30) Foreign Application Priority Data
Nov. 1, 2019 (JP) .................. 2019-199972

(51) Int. Cl.
*B01D 35/00* (2006.01)
*B01D 39/16* (2006.01)
(Continued)

(52) U.S. Cl.
CPC .......... *B32B 29/005* (2013.01); *B01D 35/005* (2013.01); *B01D 39/163* (2013.01);
(Continued)

(58) Field of Classification Search
CPC ......... B32B 29/005; B32B 7/12; B32B 29/06; B32B 29/08; B32B 2250/02;
(Continued)

(56) References Cited

U.S. PATENT DOCUMENTS

2013/0092639 A1* 4/2013 Harp .................... B01D 17/045
210/799
2013/0331500 A1* 12/2013 Yokoe .................... C08L 61/02
524/502

(Continued)

FOREIGN PATENT DOCUMENTS

JP  5-49825   3/1993
JP  6-126112  5/1994
(Continued)

OTHER PUBLICATIONS

English translation of Goodby patent publication KR-20180037280-A, published Apr. 11, 2018. (Year: 2018).*

(Continued)

*Primary Examiner* — Joseph W Drodge
(74) *Attorney, Agent, or Firm* — Wenderoth, Lind & Ponack, L.L.P.

(57) ABSTRACT

It is provided that a layered body having excellent absorption speeds of fuel and the like to the filter media. A layered body comprising a first base material and a second base material, wherein the first base material and the second base material are adhered to each other via an adhesive, the first and second base materials each contain a phenol-based resin and an aliphatic hydrocarbon detected during a retention time of 12.0 to 30.0 minutes under pyrolysis-gas chromatography mass spectrometry (PY-GC/MS), and the adhesive contains 65 mol % or more of a butylene terephthalate unit and 5 mol % or more of a butylene isophthalate unit, and has an acid value of not larger than 100 eq/ton, a glass transition (Continued)

temperature of −10 to 60° C., and a specific gravity of not less than 1.20.

3 Claims, 1 Drawing Sheet

(51) Int. Cl.
*B01D 39/18* (2006.01)
*B32B 7/12* (2006.01)
*B32B 29/00* (2006.01)
*B32B 29/06* (2006.01)
*B32B 29/08* (2006.01)
*C09J 167/02* (2006.01)

(52) U.S. Cl.
CPC .............. *B01D 39/18* (2013.01); *B32B 7/12* (2013.01); *B32B 29/06* (2013.01); *B32B 29/08* (2013.01); *C09J 167/02* (2013.01); *B01D 2239/0464* (2013.01); *B01D 2239/0681* (2013.01); *B01D 2239/1291* (2013.01); *B32B 2250/02* (2013.01); *B32B 2250/26* (2013.01); *B32B 2260/028* (2013.01); *B32B 2260/046* (2013.01); *B32B 2262/0284* (2013.01); *B32B 2262/062* (2013.01); *B32B 2262/14* (2013.01); *B32B 2307/726* (2013.01)

(58) Field of Classification Search
CPC .......... B32B 2250/26; B32B 2260/028; B32B 2260/046; B32B 2262/0284; B32B 2262/062; B32B 2262/14; B32B 2307/726; B32B 27/14; B32B 27/28; B32B 2250/028; B32B 2260/0284; B01D 35/005; B01D 39/163; B01D 39/18; B01D 2239/0464; B01D 2239/0681; B01D 2239/1291; B01D 2239/0668; B01D 2239/086; B01D 2239/10; B01D 39/1623; B01D 39/16; B01D 39/1607; B01D 2239/0654; B01D 2239/08; B01D 2239/083; C09J 167/02
See application file for complete search history.

(56) References Cited

U.S. PATENT DOCUMENTS

| | | | | |
|---|---|---|---|---|
| 2013/0340398 A1* | 12/2013 | Battenfeld | ........... | B01D 39/163 162/146 |
| 2013/0341290 A1* | 12/2013 | Yu | .......... | B01D 39/18 210/504 |
| 2014/0130469 A1* | 5/2014 | Nagy | .................. | B01D 39/163 55/486 |
| 2016/0136553 A1* | 5/2016 | Healey | .............. | B01D 39/2017 55/486 |
| 2020/0054975 A1* | 2/2020 | Belmont | ................ | D21H 11/18 |

FOREIGN PATENT DOCUMENTS

| | | | | |
|---|---|---|---|---|
| KR | 20180037280 A | * | 4/2018 | ............ B01D 39/18 |
| KR | 20190038654 A | * | 4/2019 | ............ C01B 13/10 |
| TW | 200724576 A | * | 7/2007 | ......... B01D 11/0223 |

OTHER PUBLICATIONS

English translation of patent publication TW-200724576-A, published Jul. 1, 2007. (Year: 2007).*
English Translation of Patent Publication KR 20190038654A, published Apr. 8, 2019. (Year: 2019).*
International Search Report issued Dec. 15, 2020 in International (PCT) Application No. PCT/JP2020/038464.

* cited by examiner

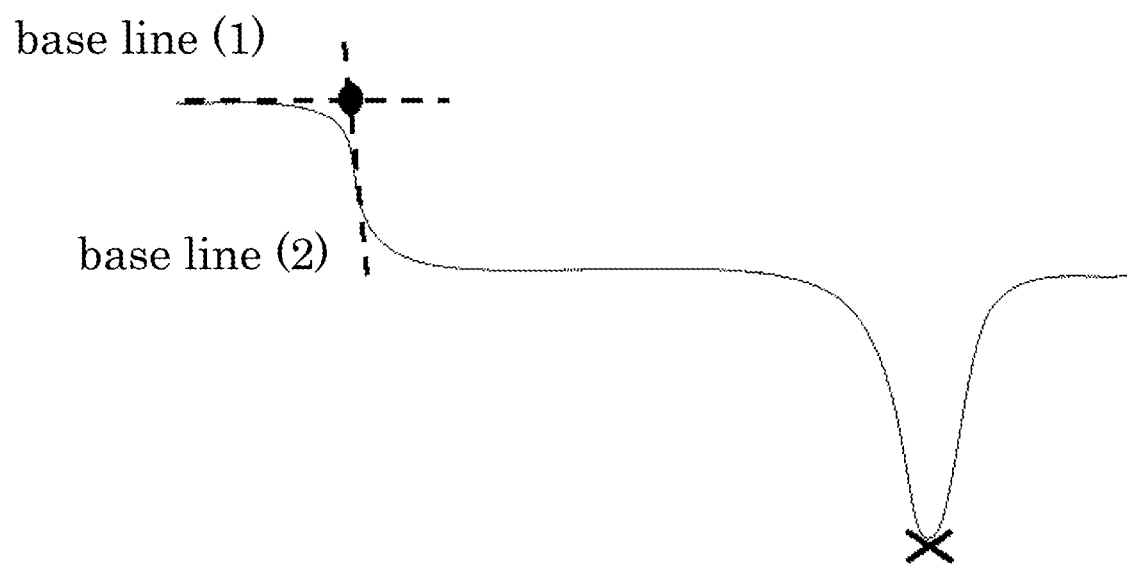

LAYERED BODY

TECHNICAL FIELD

The present invention relates to a layered body.

BACKGROUND ART

Conventionally, a filter medium that is a layered body is used for removing suspended matter such as particles contained in various liquids such as fuel, engine oil for an automobile, and the like (hereinafter, referred to as fuel and the like) and obtaining clean liquids.

For example, Patent Documents 1 and 2 below disclose filter media. Patent Document 1 discloses a filter medium including a plurality of fibers having different fiber diameters. In addition, Patent Document 2 discloses a filter medium in which each of the maximum and average pore diameters of an upstream layer and a downstream layer is controlled to be in a specific range and the upstream layer has a crimped fiber having a modified cross-sectional shape.

CITATION LIST

Patent Literature

Patent Document 1: Japanese Laid-Open Patent Publication No. H6-126112
Patent Document 2: Japanese Laid-Open Patent Publication No. H5-49825

SUMMARY OF THE INVENTION

Problems to be Solved by the Invention

There is room for improvement in the absorption speeds of fuel and the like to the filter media described in the above Patent Documents (hereinafter, referred to as affinity for fuel and the like).

Solution to the Problems

As a result of earnest studies, the present inventors have found that a layered body having high affinity for fuel and the like is obtained by using a base material containing a phenol-based resin and a predetermined aliphatic hydrocarbon, and have completed the present invention.

That is, the present invention includes the following invention.

[1] A layered body comprising a first base material and a second base material, wherein
  the first base material and the second base material are adhered to each other via an adhesive,
  the first and second base materials each contain a phenol-based resin and an aliphatic hydrocarbon (A) detected during a retention time of 12.0 to 30.0 minutes under the following measurement condition 1 of pyrolysis-gas chromatography mass spectrometry (PY-GC/MS), and
  the adhesive contains 65 mol % or more of a butylene terephthalate unit and 5 mol % or more of a butylene isophthalate unit, and has an acid value of not larger than 100 eq/ton, a glass transition temperature of −10 to 60° C., and a specific gravity of not less than 1.20,
  measurement condition 1 of pyrolysis-gas chromatography mass spectrometry (PY-GC/MS): holding at 200° C. for 10 minutes in a PY section, holding at 40° C. for 2 minutes in a GC section, and raising a temperature to 300° C. at a temperature rising rate of 10° C./min.

[2] The layered body according to the above [1], wherein the first and second base materials each contain 0.1% by mass or less of a decomposed product of the phenol-based resin detected under the following measurement condition 2 of pyrolysis-gas chromatography mass spectrometry (PY-GC/MS),
  measurement condition 2 of pyrolysis-gas chromatography mass spectrometry (PY-GC/MS): holding at 500° C. for 1 minute in a PY section, holding at 40° C. for 2 minutes in a GC section, and raising a temperature to 300° C. at a temperature rising rate of 10° C./min.

[3] The layered body according to the above [1] or [2], wherein the first and second base materials each contain 0.1% by mass or more of the aliphatic hydrocarbon (A).

[4] The layered body according to any one of the above [1] to [3], wherein the aliphatic hydrocarbon (A) includes an aliphatic hydrocarbon having a branch.

[5] The layered body according to any one of the above [1] to [4], wherein the first and second base materials each contain at least one selected from polyethylene terephthalate and cellulose.

Effect of Invention

The layered body of the present invention has excellent affinity for fuel and the like. Accordingly, it is possible to efficiently filter fuel and the like.

BRIEF DESCRIPTION OF THE DRAWINGS

The FIGURE illustrates a method for calculating a melting point and a glass transition temperature.

MODE FOR CARRYING OUT THE INVENTION

The layered body of the present invention is a layered body comprising a first base material and a second base, and the first base material and the second base material are adhered to each other via an adhesive.

<First Base Material>

The first base material preferably contains at least one selected from polyethylene terephthalate and cellulose, more preferably contains polyethylene terephthalate and cellulose.

The first base material contains a phenol-based resin and an aliphatic hydrocarbon (A) detected during a retention time of 12.0 to 30.0 minutes under the following measurement condition 1 of pyrolysis-gas chromatography mass spectrometry (PY-GC/MS). By using the base material containing the aliphatic hydrocarbon (A), the layered body of the present invention becomes a layered body having excellent affinity for fuel and the like, and has good fuel filterability. The content of the aliphatic hydrocarbon (A) can be calculated under the following measurement condition 1 of pyrolysis-gas chromatography mass spectrometry (FY-GC/MS). This measurement is a quantifying method based on the ratio of the peak area of a peak derived from a standard sample (dimethylsiloxane cyclic tetramer) and the peak area of a peak derived from a component to be quantified (the aliphatic hydrocarbon in the measurement condition 1, a decomposed product of the phenol-based resin in a measurement condition 2 described later) in an obtained chromatogram. Specific measurement methods and measurement conditions other than those described below will be described later.

Measurement condition 1 of pyrolysis-gas chromatography mass spectrometry (PY-GC/MS): holding at 200° C. for 10 minutes in a PY section, holding at 40° C. for 2 minutes in a GC section, and raising a temperature to 300° C. at a temperature rising rate of 10° C./min.

The first base material preferably contains 0.1% by mass or more, more preferably contains 0.5% by mass or more, further preferably 1% by mass or more of the aliphatic hydrocarbon (A). The content of the aliphatic hydrocarbon (A) in first base material is preferably 5% by mass or less, more preferably 3% by mass or less. The aliphatic hydrocarbon (A) is preferably an aliphatic hydrocarbon having a branch, more preferably an aliphatic hydrocarbon having a branch and having 6 to 50 carbon atoms, further preferably an aliphatic hydrocarbon having a branch and having 10 to 40 carbon atoms, and particularly preferably an aliphatic hydrocarbon having a branch and having 1.5 to 30 carbon atoms.

The aliphatic hydrocarbon (A) contained in the first base material preferably includes two or more aliphatic hydrocarbons having different boiling points. Among them, the aliphatic hydrocarbon (A) preferably includes a low-boiling-point aliphatic hydrocarbon (A1) for which a retention time is not shorter than 12.0 minutes and shorter than 19.1 minutes and a high-boiling-point aliphatic hydrocarbon (A2) for which a retention time is not shorter than 19.1 minutes and shorter than 30.0 minutes. By using the base material containing two or more aliphatic hydrocarbons having different boiling points, the affinity for fuel and the like can be further enhanced. The first base material contains preferably 0.1% by mass or more, more preferably 0.5% by mass or more of the low-boiling-point aliphatic hydrocarbon (A1). The content of the aliphatic hydrocarbon (A1) is preferably not higher than 3% by mass and more preferably not higher than 1% by mass. In addition, the first base material contains preferably 0.1% by mass or more, more preferably 0.5% by mass or more of the high-boiling-point aliphatic hydrocarbon (A2). The content of the aliphatic hydrocarbon (A2) is preferably not higher than 3% by mass and more preferably not higher than 1% by mass.

The low-boiling-point aliphatic hydrocarbon (A1) is preferably an aliphatic hydrocarbon having 6 to 24 carbon atoms. Among them, the low-boiling-point aliphatic hydrocarbon (A1) is more preferably an aliphatic hydrocarbon having a branch, and further preferably an aliphatic hydrocarbon having a branch and having 15 to 24 carbon atoms. In addition, the high-boiling-point aliphatic hydrocarbon (A2) is preferably an aliphatic hydrocarbon having 25 to 50 carbon atoms. Among them, the high-boiling-point aliphatic hydrocarbon (A2) is more preferably an aliphatic hydrocarbon having a branch, and further preferably an aliphatic hydrocarbon having a branch and having 25 to 35 carbon atoms.

Whereas the first base material contains the phenol-based resin, the first base material contains preferably 0.5% by mass or less, more preferably 0.1% by mass or less of a decomposed product of the phenol-based resin detected under the following measurement condition 2 of pyrolysis-gas chromatography mass spectrometry (PY-GC/MS). By using the base material from which a phenol-based component hardly precipitates even when the temperature thereof is raised to 500° C., the heat resistance can be enhanced. Examples of the decomposed product of the phenol-based resin detected under the following measurement condition 2 include decomposed products such as o-cresol, p-cresol, 2,6-dimethylphenol, 2,4-dimethylphenol, trimethylphenol, and dihydroxydiphenylmethane. The total amount of the above six decomposed products of the phenol-based resin is regarded as the decomposed product of the phenol-based resin detected under the following measurement condition 2. Each compound is identified by a fragment of MS. When the peaks of two or more compounds overlap, each compound is identified by a fragment, and then the contained amount thereof is measured. Trimethylphenol and dihydroxydiphenylmethane include regioisomers.

Measurement condition 2 of pyrolysis-gas chromatography mass spectrometry (PY-GC/MS): holding at 500° C. for 1 minute in a PY section, holding at 40° C. for 2 minutes in a GC section, and raising a temperature to 300° C. at a temperature rising rate of 10° C./min.

In the following, the decomposed product of the phenol-based resin measured under the above-described pyrolysis temperature and pyrolysis conditions is simply referred to as "decomposed product of the phenol-based resin". Specific measurement methods and measurement conditions other than the above will be described later.

The first base material can be produced, for example, by performing paper-making on a filter medium fiber made of polyethylene terephthalate or cellulose, to obtain a filter medium base paper, impregnating the filter medium base paper with a phenol-based resin, and then curing the phenol-based resin.

The composition of the first base material can be analyzed, for example, by the following method.

Approximately 100 mg of a first filter medium is sampled and immersed in chloroform, and then the extract is collected. After the operation of collecting an extract after immersion in chloroform is repeated three times, the residue is immersed in a mixed solution of chloroform and hexafluoro-2-propanol (chloroform: hexafluoro-2-propanol=50:50 (mass ratio)), and then the extract is collected. After the operation of collecting an extract after immersion in the mixed solution of chloroform and hexafluoro-2-propanol is repeated three times, the resulting residue is subjected to IR analysis to identify the components thereof. In addition, the six extracts obtained by the above operations are collectively dried and then dissolved in a mixed solution of $CDCl_3$ and trifluoroacetic acid ($CDCl_3$:trifluoroacetic acid=85:15 (mass ratio)), and the components thereof are identified by $^1H$ NMR measurement. The composition of the first filter medium can be specified from the results of the IR analysis and the $^1H$ NMR measurement.

<Second Base Material>

As the second base material, a base material that is the same as the first base material may be used, or a base material different from the first base material may be used. However, the first base material and the second base material are preferably the same. A suitable composition, physical properties, production method, etc., of the second base material are the same as those of the first base material, and thus the description thereof is omitted.

<Adhesive>

The adhesive is mainly composed of polyester resin, and specifically contains 65 mol % or more of a butylene terephthalate unit and 5 mol % or more of a butylene isophthalate unit.

The adhesive preferably contains 70 mol % or more of a butylene terephthalate unit. The adhesive contains 95 mol % or less, preferably 90 mol % or less, more preferably 80 mol % or less, further preferably 75 mol % or less of a butylene terephthalate unit.

The adhesive preferably contains 10 mol % or more, more preferably 20 mol % or more, further preferably 25 mol % or more of a butylene isophthalate unit. The adhesive contains 35 mol % or less, preferably 30 mol % or less of a butylene isophthalate unit.

The acid value of the adhesive is 100 eq/ton or less, preferably 10 to 70 eq/ton, and more preferably 15 to 60 eq/ton.

The glass transition temperature of the adhesive is −10 to 60° C., preferably 0 to 50° C., and more preferably 10 to 40° C.

The specific gravity of the adhesive is 1.20 or more, preferably 1.20 to 1.50, and more preferably 1.25 to 1.40.

The melting point of the adhesive is preferably 150 to 200° C., and more preferably 160 to 190° C.

The reduced viscosity of the adhesive is preferably 0.5 to 1.2 dl/g, more preferably 0.6 to 1.0 dl/g.

The methods for measuring the acid value, the glass transition temperature, the specific gravity, the melting point, and the reduced viscosity of the adhesive will be described later.

The adhesive may contain a unit other than the butylene terephthalate unit and the butylene isophthalate unit (hereinafter, referred to as other unit). Specifically; the other unit may be a unit derived from a diol component other than 1,4-butanediol, or may be a unit derived from a dicarboxylic acid other than terephthalic acid and isophthalic acid.

Examples of the dicarboxylic acid for forming the other unit include: aromatic dicarboxylic acids such as orthophthalic acid, 1,5-naphthalic acid, 2,6-naphthalic acid, 4,4'-diphenyldicarboxylic acid, 2,2'-diphenyldicarboxylic acid, and 4,4'-diphenyl ether dicarboxylic acid; and alicyclic dicarboxylic acids such as 1,4-cyclohexanedicarboxylic acid, 1,3-cyclohexanedicarboxylic acid, 1,2-cyclohexanedicarboxylic acid, and 4-methyl-1,2-cyclohexanedicarboxylic acid.

Examples of the diol component for forming the other unit include: aliphatic diols such as ethylene glycol, 1,2-propanediol, 1,3-propanediol, 1,2-butanediol, 1,3-butanediol, 2-methyl-1,3-propanediol, 1,5-pentanediol, 1,6-hexanediol, 3-methyl-1,5-pentanediol, neopentyl glycol, diethylene glycol, dipropylene glycol, 2,2,4-trimethyl-1,3-pentanediol, cyclohexanedimethanol, tricyclodecanedimethanol, and neopentyl glycol; alicyclic diols such as 1,4-cyclohexanedimethanol; and aromatic diols such as bisphenol A.

The content of the other unit contained in the adhesive is preferably not higher than 20 mol %, more preferably not higher than 10 mol %, further preferably not higher than 5 mol %, particularly preferably not higher than 1 mol %, and most preferably 0 mol % (the adhesive contains only the butylene terephthalate unit and the butylene isophthalate unit).

However, a unit derived from an aliphatic dicarboxylic acid deteriorates the hydrolysis resistance, decreasing the durability against high-temperature fuel. Thus, the adhesive contains preferably 3 mol % or less of the unit derived from an aliphatic dicarboxylic acid, more preferably 1 mol % or less of the unit derived from an aliphatic dicarboxylic acid, and further preferably contains 0 mol % of the unit derived from an aliphatic dicarboxylic acid (no unit derived from an aliphatic dicarboxylic acid is contained).

As a method for producing the polyester used for the adhesive, a known method can be used. For example, the desired polyester can be obtained by subjecting the above dicarboxylic acid and diol component to an esterification reaction at 150 to 250° C. and then performing polycondensation at 230 to 300° C. while reducing the pressure.

As long as the effect of the present invention is not impaired, the adhesive may contain a filler such as talc, silica, and mica, a plasticizer such as higher fatty acids, a phenol-based, phosphorus-based, or amine-based antioxidant, a sulfur-based anti-thermal aging agent, a titanium or phosphorus-based catalyst, a hydrolysis resistant agent such as epoxy and carbodiimide, or the like. Even in the case of containing a filler, a plasticizer, an antioxidant, a hydrolysis resistant agent, etc., the contents thereof are preferably lower, and specifically, the mass of the polyester resin in the adhesive is preferably not less than 80% by mass, more preferably not less than 90% by mass, further preferably not less than 95% by mass, particularly preferably not less than 99% by mass, and most preferably 100% by mass.

For the adhesive, the components thereof can be identified by dissolving the adhesive in a mixed solution of $CDCl_3$ and trifluoroacetic acid ($CDCl_3$:trifluoroacetic acid=85:15 (mass ratio)), centrifuging the solution, and then performing NMR measurement.

<Layered Body>

The layered body of the present invention is suitable for use for, for example, a fuel filter for filtering fuel to be supplied to an internal combustion engine. This fuel filter can be installed in a passage for supplying fuel from a fuel pump to the internal combustion engine, a passage for returning fuel from the internal combustion engine to the fuel tank, or the like. The fuel filter may be installed either inside or outside the fuel tank. Furthermore, when the layered body of the present invention is housed in a filter housing to form the fuel filter, the filter housing can be integrated with a resin lid that is provided at an opening of the fuel tank.

An example of the fuel filter is a roll-shaped layered body obtained by winding a stack including a long flat plate filter medium as the first base material and a long corrugated plate filter medium as the second base material, in a longitudinal direction. Fuel can be filtered by passing the fuel from one end portion to another end portion in the width direction of the roll-shaped layered body. In the following, the one end portion in the width direction of the layered body is sometimes referred to as an upstream side, and the other end portion is sometimes referred to as a downstream side.

The method for producing the roll-shaped layered body will be described. The flat plate filter medium can be produced by performing paper-making on a filter medium fiber made of cellulose, to obtain a filter medium base paper, impregnating the filter medium base paper with a phenol-based resin, and curing the phenol-based resin. In addition, the corrugated plate filter medium is obtained by forming the flat plate filter medium into a corrugated shape by using a corrugated roller. The long flat plate filter medium and the long corrugated plate filter medium are stacked into a layered body, and an adhesive is applied between the flat plate filter medium and the corrugated plate filter medium on the downstream side of the layered body, and the layered body is pressed by a roller to heat-press the layered body. Moreover, the adhesive is applied between the flat plate filter medium and the corrugated plate filter medium on the upstream side such that the valley portions of the corrugated plate filter medium are fixed to the flat plate filter medium. Next, the layered body is wound with the corrugated plate filter medium side being the radially inner side, to form a roll-shaped layered body. By applying the adhesive to the upstream side of the corrugated plate filter medium at the time of winding, the corrugated plate filter medium and a portion, of the flat plate filter medium, on the radially inner side of the corrugated plate filter medium are adhered to each other.

The fuel flowing in from the upstream side passes through the flat plate filter medium or the corrugated plate filter medium and flows to the downstream side. The fuel is filtered when passing through the flat plate filter medium or the corrugated plate filter medium.

This application claims priority to Japanese Patent Application No. 2019-199972, filed on Nov. 1, 2019. The entire contents of the specifications of Japanese Patent Application No. 2019-199972, filed on Nov. 1, 2019 are hereby incorporated by reference.

EXAMPLES

The present invention is more specifically described by way of the following examples. However, the present invention is not naturally limited to the following examples, and as a matter of course, can be appropriately modified and implemented within the scope of complying with the gist of the descriptions above and below. Those all fall within the technical scope of the present invention.

Methods for measuring acid value, melting point, glass transition temperature, specific gravity, and reduced viscosity of the adhesive are shown below.
<Acid Value>

0.2 g of a sample resin (adhesive) was precisely weighed and dissolved in 20 ml of chloroform. Then, the solution was titrated with 0.01 N potassium hydroxide (solution in ethanol) to determine the acid value. A phenolphthalein solution was used as an indicator. The unit of the acid value was eq/ton, that is, equivalent per ton of the sample.
<Melting Point and Glass Transition Temperature>

A differential scanning calorimeter (DSC 220 type) manufactured by Seiko Electronic Industry was used and 5 mg of a sample resin (adhesive) for the measurement was placed in an aluminum pan, tightly sealed by pressing a cover and once held at 250° C. for 5 minutes. After that, quick cooling was done using liquid nitrogen. Then, the measurement was conducted under a temperature-rising rate of 20° C./min from −100° C. to 250° C. In the resulting curve, a crossing point (marked circle in the drawing) of a tangent (1) obtained from a base line before an inflection point of a part wherein the inflection point appears in DSC as shown in the FIGURE with a tangent (2) obtained from the base line after the inflection point was adopted as the glass transition temperature, and the minimum point (marked "x" in the drawing) of an endothermic peak was adopted as the melting point.
<Specific Gravity>

A graduated cylinder containing a calcium chloride solution whose specific gravity value had been known was placed in a water tank at 30° C. for 15 to 20 minutes to be warmed to a predetermined temperature. Then, a small piece (5 mm×5 mm) of a sample resin (adhesive) whose crystallization had been completed at 60° C. was put into the graduated cylinder. The concentration of the calcium chloride solution was adjusted by adding water or a concentrated calcium chloride solution such that the sample was suspended in the solution. A specific gravity meter was floated on the adjusted calcium chloride solution to measure the specific gravity.
<Reduced Viscosity>

Approximately 0.1 g of a sample resin (adhesive) was placed in a 25 ml volumetric flask, dissolved in a mixed solvent (phenol/tetrachloroethane=60/40 (weight ratio)), and measured at 30° C. using an Ubbelohde viscosity tube.
<Pyrolysis-Gas Chromatography Mass Spectrometry>

The aliphatic hydrocarbon in a filter was measured by a method described in the following measurement method 1. In addition, the decomposed product of the phenol-based resin in the filter was measured by a method described in the following measurement method 2. The measurement was performed using a pyrolysis-gas chromatography mass spectrometry (PY-GC/MS) apparatus in both measurement methods 1 and 2.
(Measurement Method 1)

0.5 mg of a sample was weighed and introduced into the PY section of the pyrolysis-gas chromatography mass spectrometry (PY-GC/MS) apparatus. A 110 mg/L dimethylsiloxane cyclic tetramer was used as an external standard substance, and measurement was performed with one-point calibration by an external standard method. The total amount of aliphatic hydrocarbons detected during a retention time of 12.0 to 30.0 minutes was regarded as the contained amount of the aliphatic hydrocarbon (A).
(Measurement Method 2)

0.2 mg of a sample was weighed and introduced into the PY section of the pyrolysis-gas chromatography mass spectrometry (PY-GC/MS) apparatus. A 110 mg/L dimethylsiloxane cyclic tetramer was used as an external standard substance, and measurement was performed with one-point calibration by an external standard method. The retention times (peak positions) of decomposed products of the phenol-based resin are as follows, and the total amount of the following six decomposed products of the phenol-based resin was regarded as the contained amount of the decomposed product of the phenol-based resin.

o-Cresol: 9.38 minutes to 9.53 minutes
p-Cresol: 9.75 minutes to 9.88 minutes
2,6-Dimethylphenol: 10.28 minutes to 10.42 minutes
2,4-Dimethylphenol: 10.96 minutes to 11.15 minutes
Trimethylphenol: 11.93 minutes to 11.99 minutes
Dihydroxydiphenylmethane: 22.86 minutes to 23.07 minutes The PY-GC/MS apparatus and measurement conditions used in the measurement methods 1 and 2 are as follows. The measurement conditions are the same for both measurement methods 1 and 2 except for the decomposition furnace heating conditions.
[PY Section]
 Used device: Double Shot Pyrolyzer PY-2020iD manufactured by Frontier Laboratories Ltd.
 Decomposition furnace heating conditions: 200° C.×10 min (time of measurement of aliphatic hydrocarbon: measurement condition 1), 500° C.×1 min (time of measurement of decomposed product of phenol-based resin: measurement condition 2)
 Decomposition furnace heating atmosphere: Helium (He)
 Interface temperature: 320° C.
[GC Section]
 Used device: GC/MS-QP2010Plus manufactured by Shimadzu Corporation
 Used column: Ultra ALLOY-5 (MS/FIT) manufactured by Frontier Laboratories Ltd., length: 30 m, inner diameter: 0.25 mm, film thickness: 0.25 μm
 Column temperature: After 2 minutes at 40° C., raising the temperature at 10° C./min and holding the temperature at 300° C. for 15 minutes
 Carrier gas: Helium (He)
 Carrier gas control mode: Constant pressure mode Column inlet pressure: 80 kPa (column linear velocity at the time of injection: 43.4 cm/sec)
Purge flow rate: 3.0 mL/min
Injection inlet temperature: 320° C.
Injection method: Split injection method
Split ratio: 30
[MS Section]
Ion source temperature: 250° C.
Interface temperature: 320° C.
Measurement mode: SCAN mode
Measured mass range (SCAN): m/z 30-550
Event time: 0.5 sec
Ionization method: Electron ionization method (EI method)
Ionization voltage: 70 eV
<Filter A>

A long flat plate filter medium was used as a first base material, a long corrugated plate filter medium was used as a second base material, an adhesive described later was used, and a stack of the long flat plate filter medium and the long corrugated plate filter medium was wound in the longitudinal direction thereof to produce a roll-shaped filter A. The method for producing the roll-shaped filter A is as described above in <First Base Material> and <Layered Body>. The first base material contains cellulose, a phenol-based resin, and polyethylene terephthalate, and the mass of polyethylene terephthalate contained in the base material is 38% by mass. In addition, the first base material contains 0.92% by mass of the aliphatic hydrocarbon (A1) for which the retention time in the measurement condition 1 of pyrolysis-gas chromatography mass spectrometry (PY-GC/MS) is not shorter than 1.2.0 minutes and shorter than 19.1 minutes, contains 0.70% by mass of the aliphatic hydrocarbon (A2) for which the retention time in the measurement condition 1 of pyrolysis-gas chromatography mass spectrometry (PY-GC/MS) is not shorter than 19.1 minutes and shorter than 30.0 minutes, and contains 0.06% by mass of the decomposed product of the phenol-based resin under the measurement condition 2. The second base material is the same as the first base material, and was obtained by forming the flat plate filter medium that is the first base material, into a corrugated shape by using a corrugated roller. The adhesive contains 71 mol % of a butylene terephthalate unit and 29 mol % of a butylene isophthalate unit. The acid value of the adhesive was 37 eq/ton, the glass transition temperature of the adhesive was 27° C., the melting point of the adhesive was 176° C., the specific gravity of the adhesive was 1.30, and the reduced viscosity of the adhesive was 0.73 dl/g.

<Filter B>

A long flat plate filter medium was used as a first base material, a long corrugated plate filter medium was used as a second base material, an adhesive described later was used, and a stack of the long flat plate filter medium and the long corrugated plate filter medium was wound in the longitudinal direction thereof to produce a roll-shaped filter A. The method for producing the roll-shaped filter A is as described above in <Layered Body>. The first base material contains cellulose, a phenol-based resin, and polyethylene terephthalate, and the mass of polyethylene terephthalate contained in the base material is 50% by mass. In addition, the first base material doesn't contain the aliphatic hydrocarbon (A1) for which the retention time in the measurement condition 1 of pyrolysis-gas chromatography mass spectrometry (PV-GC/MS) is not shorter than 12.0 minutes and shorter than 30.0 minutes, and contains 0.13% by mass of the decomposed product of the phenol-based resin under the measurement condition 2. The second base material is the same as the first base material, and was obtained by forming the flat plate filter medium that is the first base material, into a corrugated shape by using a corrugated roller. The adhesive contains 71 mol % of a butylene terephthalate unit and 29 mol % of a butylene isophthalate unit. The acid value of the adhesive was 37 eq/ton, the glass transition temperature of the adhesive was 27° C., the melting point of the adhesive was 176° C., the specific gravity of the adhesive was 1.30, and the reduced viscosity of the adhesive was 0.73 dl/g.

<Measurement of Mass Change Ratio>

The filter A having a thickness of 1.5 mm was cut into a size of 1 cm×3.5 cm and then allowed to stand at a constant temperature and humidity of 23° C. and 55% RH for 12 hours, and then the mass of the test piece of the filter A was measured with a precision balance (about 0.21 g). Then, at a room temperature of 23° C., one end (surface having a length of 1 cm) of the test piece of the filter A was immersed in 10 ml of kerosene contained in a plastic container having an inner diameter of 6 cm ϕ, and the time required until the kerosene permeated to the other end of the test piece was measured with a stopwatch. After the above test, the test piece of the filter A was taken out, and the kerosene on the surface of the test piece was lightly wiped off with a paper wiper. Then, the mass of the test piece of the filter A was measured with a precision balance, and the mass change ratio (mass increase ratio) from before the test was calculated by the following equation.

Mass change ratio (%)=100×(mass(g) of filter after immersion in kerosene−mass(g) of filter before immersion in kerosene)/mass(g) of filter before immersion in kerosene In addition, the mass change ratios after 15 minutes, 2 hours, 21 hours, and 24 hours from the end of the above immersion were also calculated.

The filter B was also measured for mass change ratio in the same manner as described above.

The mass change ratios of the filters A and B are systematically shown in Table 1 below.

TABLE 1

| | Mass change ratio | |
|---|---|---|
| Lapse of time | Filter A (Example) | Filter B (Comparative Example) |
| 0 hour (at the end of immersion) | 152% | 100% |
| 15 minutes | 105% | 68% |
| 2 hours | 52% | 48% |
| 21 hours | 14% | 20% |
| 24 hours | 5% | 12% |

It was found that the time required until the kerosene permeated from the one end to the other end of the filter was 11.00 seconds for the filter A and 13.72 seconds for the filter B, and the time for the filter A was shorter. It was also found that the mass change ratio (mass increase ratio) immediately after the end of immersion was 152% for the filter A and 100% for the filter B, and the mass change ratio for the filter A was larger. From the above, it can be found that the filter A has higher affinity for kerosene than the filter B, and absorbs kerosene in a shorter time.

Moreover, based on the mass change ratios after 15 minutes, 2 hours, 21 hours, and 24 hours from the end of immersion, it was found that the filter A releases absorbed kerosene in a shorter time than the filter B. From the above, it was found that kerosene can be filtered with high efficiency by using the filter A.

The invention claimed is:

1. A layered body comprising
a first base material containing a phenol-based resin, a low-boiling-point aliphatic hydrocarbon (A1) having a branch and having 15 to 24 carbon atoms, and a high-boiling-point aliphatic hydrocarbon (A2) having a branch and having 25 to 35 carbon atoms, and
a second base material containing a phenol-based resin, a low-boiling-point aliphatic hydrocarbon (A1) having a branch and having 15 to 24 carbon atoms, and a high-boiling-point aliphatic hydrocarbon (A2) having a branch and having 25 to 35 carbon atoms,
wherein the first base material contains 0.5 to 3% by mass of the low-boiling-point aliphatic hydrocarbon (A1) and 0.5 to 3% by mass of the high-boiling-point aliphatic hydrocarbon (A2), and the second base material contains 0.5 to 3% by mass of the low-boiling-point aliphatic hydrocarbon (A1) and 0.5 to 3% by mass of the high-boiling-point aliphatic hydrocarbon (A2),
wherein the first base material and the second base material are adhered to each other via an adhesive containing 65 mol % or more of a butylene terephthalate unit and 5 mol % or more of a butylene isophthalate unit, and having an acid value of not larger than 100 eq/ton, a glass transition temperature of −10 to 60° C., and a specific gravity of not less than 1.20,
wherein the first base material and the second base material are the same or different,
wherein the low-boiling-point aliphatic hydrocarbon (A1) is detectable for a retention time of not shorter than 12.0 minutes and shorter than 19.1 minutes under a measurement condition 1 of pyrolysis-gas chromatography mass spectrometry (PY-GC/MS), and
the high-boiling-point aliphatic hydrocarbon (A2) is detectable for a retention time of not shorter than 19.1 minutes and shorter than 30.0 minutes under a measurement condition 1 of pyrolysis-gas chromatography mass spectrometry (PY-GC/MS), and
wherein the measurement condition 1 of pyrolysis-gas chromatography mass spectrometry (PY-GC/MS) includes, for the layered body, holding at 200° C. for 10 minutes in a PY section, holding at 40° C. for 2 minutes in a GC section, and raising a temperature to 300° C. at a temperature rising rate of 10° C./min.

2. The layered body according to claim 1, wherein the first and second base materials each contain 0.1% by mass or less of a decomposed product of the phenol-based resin detected under the following measurement condition 2 of pyrolysis-gas chromatography mass spectrometry (PY-GC/MS),
wherein the measurement condition 2 of pyrolysis-gas chromatography mass spectrometry (PY-GC/MS) includes, for the layered body, holding at 500° C. for 1 minute in a PY section, holding at 40° C. for 2 minutes in a GC section, and raising a temperature to 300° C. at a temperature rising rate of 10° C./min.

3. The layered body according to claim 1, wherein the first and second base materials each contain at least one material selected from polyethylene terephthalate and cellulose.

* * * * *